Figure 1:
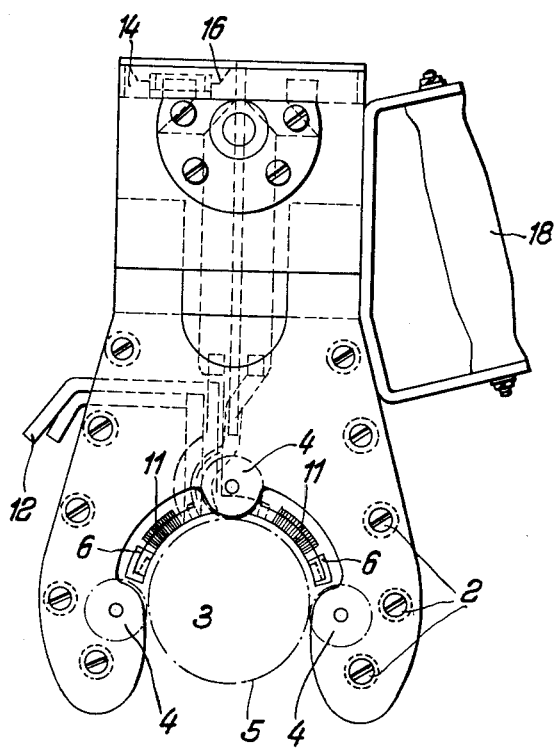

April 24, 1956

G. SEULEN ET AL 2,743,345

INDUCTION HEATING APPARATUS

Filed July 17, 1953

3 Sheets-Sheet 1

Inventors:
Gerhard Seulen
Hermann Kuhlbars
By Cushman, Darby & Cushman
attys

April 24, 1956 G. SEULEN ET AL 2,743,345
INDUCTION HEATING APPARATUS
Filed July 17, 1953 3 Sheets-Sheet 2

Inventors
Gerhard Seulen
Hermann Kuhlbars
By Cushman, Darby & Cushman
attys

April 24, 1956 G. SEULEN ET AL 2,743,345
INDUCTION HEATING APPARATUS
Filed July 17, 1953 3 Sheets-Sheet 3

Inventors
Gerhard Seulen
Hermann Kuhlbars
By Cushman, Darby & Cushman
attys 2,743,345
INDUCTION HEATING APPARATUS Gerhard Seulen, Remscheid, and Hermann Kuhlbars, Wuppertal-Elberfeld, Germany, assignors to Deutsche Edelstahlwerke Aktiengesellschaft, Krefeld, Germany Application July 17, 1953, Serial No. 368,644

4 Claims. (Cl. 219—10.43)

The present invention relates to induction heating apparatus of the kind in which the current-conducting parts of the coil or of the heating conductor loop (herein in this specification and the claims hereof termed inductor), are housed in a protective member, the object of which is to protect and/or support the actual inductor. In many cases the cooling medium arrangement is also housed in the said member. This construction affords a comparatively reliably manipulable and compact apparatus which, however, has certain objections.

By reason of the alternating fields built up around the inductor on the one hand and of the current-carrying parts on the other hand, it was accepted practice that the protective member must be constructed from insulating material. Insulating materials are known which have sufficient mechanical strength to withstand impactive and thrust-like stresses set up during operation under harsh conditions, but insulating materials having a base of plastic material are not temperature-resistant to the desired extent and are burnt by the radiant heat of the workpieces being heated or are destroyed thereby at least in the region of the surfaces and edges. This is particularly liable to take place if the apparatus is required to heat a number of workpieces in practically unbroken succession in assembly-line production. The said member then has not sufficient time to cool completely and even the provision of cooling arrangements does not provide sufficient remedy in this respect because the insulating materials are, as is well known, bad heat conductors. It has therefore frequently been necessary, for this reason alone, to recondition a heating apparatus, that is to say, practically to provide a new protecting member.

A further disadvantage of the aforesaid plastic materials is insufficient wear-resistance. This is of consequence in cases where parts of the apparatus come into contact with parts of the workpieces to be heat-treated, for example in the hardening of crankshaft pins. In such cases, it is practically inevitable that the side faces of the heating apparatus will come into contact with the rotating crank webs which, in the presence of scale, dirt and the cooling water which is required in ample quantities, produce considerable wear on the insulating materials.

In order to obviate these difficulties, it has been proposed to employ ceramic materials in the construction of the protective member and as a support for the electric conductors. Such materials, however, are much too sensitive to mechanical stresses, and above all to impact and thrust, to be used to advantage.

Now we have found that the generally held view that metallic parts should be avoided in the neighborhood of the current-carrying parts because, regardless of whether they consist of magnetic or non-magnetic material, they become very hot especially under the relatively high frequencies employed in induction heating, is erroneous and that it is possible to construct the protective member from metallic materials without danger of intolerable heating. Accordingly the present invention broadly consists in induction heating apparatus of the kind defined in which the protecting member is constructed of metallic material which is preferably non-magnetic and/or wear-resistant and temperature-resistant, such as in particular steel.

Preferably, non-magnetic materials are employed, which however must be so chosen as to have good wear-resistant and temperature-resistant properties. Therefore, non-magnetic steels will primarily be employed which at the same time are sufficiently temperature-resistant, that is to say, display little or no tendency to scaling which might occur under the influence of the radiant heat of the article being treated.

Thus we are enabled to provide a protective member which is capable of withstanding the strongest mechanical stresses which are likely normally to arise in the operation of an induction heating installation. In addition, they are well resistant to the wear which is likely normally to arise with such apparatus, and in any case such a protective member is far superior to an electrically insulating member consisting either of plastic material or of ceramic material, both mechanically and with regard to temperature-resistance, with little or no disadvantages arising in the electrical operation.

In one construction according to the invention, a protective member having two metallic plates for receiving the inductor between them are provided, which are held together in spaced relation with the aid of non-magnetic distance pieces. As seen from the narrow side, a cagelike structure giving freedom for air flow is thus obtained, the plates forming the wide sides preferably consisting of steel, and more especially non-magnetic steel.

It has been proposed to utilise protective members of insulating material as supports or mountings for the windings and leads for the inductors. In apparatus equipped with protective members, this mounting has been considered necessary because the current-carrying conductor parts are not regarded as having sufficient natural stability, although it is known simply to suspend them in the case of relatively small and uncomplicated inductors. In the last-mentioned cases, however, insulating protective members have not been provided because they have appeared to be unnecessary. The mechanical strength of a protecting member according to the invention is, however, so great that practically all mechanical stresses are withheld from the current-conducting parts. Consequently, it is possible in accordance with the invention simply to suspend the inductor of the apparatus within the protective member. Apart from the substantial simplification which can thus be obtained in the whole structure, the extremely great advantage is obtained that the air can flow freely through the cage-like member and can cool the heating conductor, and in any case little or no heat is retained because no insulating materials are present.

In some cases, allowance might have to be made for undesirable heating of the plates of the protecting member owing to particular operating conditions. In such cases, however, internal cooling of the plates may be effected by fitting to the walls of the protecting member, tubes through which cooling medium is passed. The simplest means of achieving this is for the cooling medium, after it has flown through the inductor, to be led through the cooling tubes for the protective member before it is discharged into the atmosphere. Such an apparatus will operate in a completely satisfactory manner even if considerable heating by radiation from the heated workpiece or by contact therewith is to be feared.

It will readily be seen that the apparatus according to the invention may be employed for all purposes of induction heating. However, particular advantages are obtained with apparatus which are used to heat crankshaft pins incidental to hardening the same. Such apparatus must be constantly applied to new pins if these are to be treated in the assembly-line system, and they must follow the turning movement of the crank pins, thus it is practically unavoidable that the crank webs will come into frictional contact with the side walls of the apparatus even though this may not be desired. In many cases, the set up of such induction apparatus is such that the heating head must be placed in position during the rotation of the crankshaft. Apparatus according to the invention is well suited to withstand the mechanical stresses and the stresses resulting from the elevated temperatures.

Figure 2:
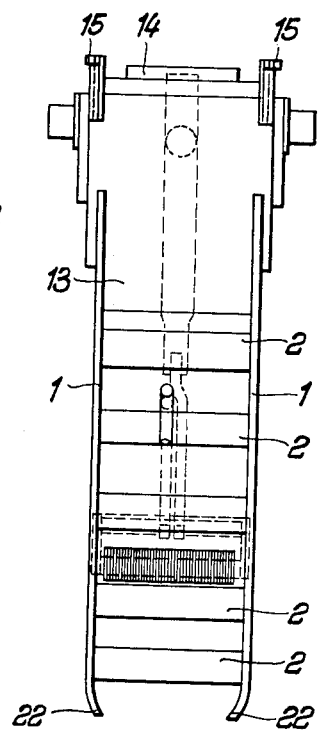
Figure 4:
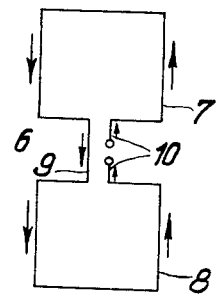
Figure 5:
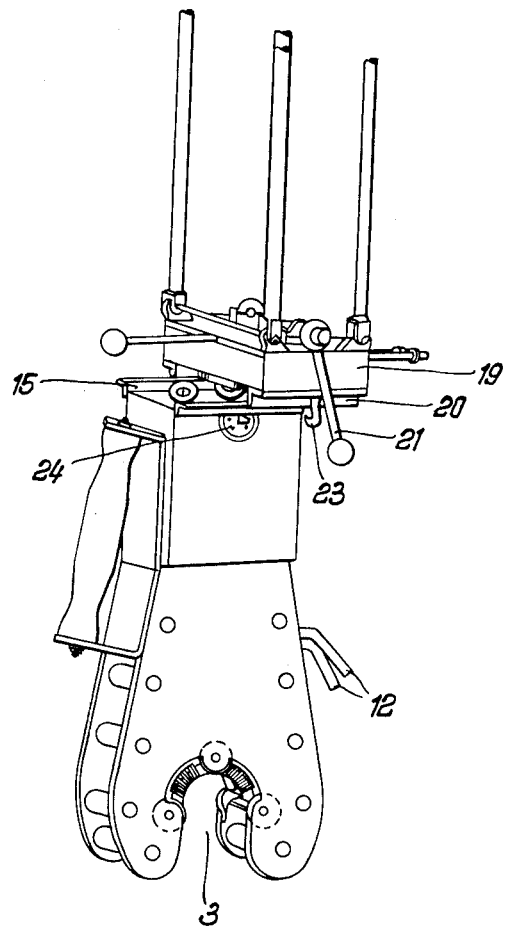
Figure 6:
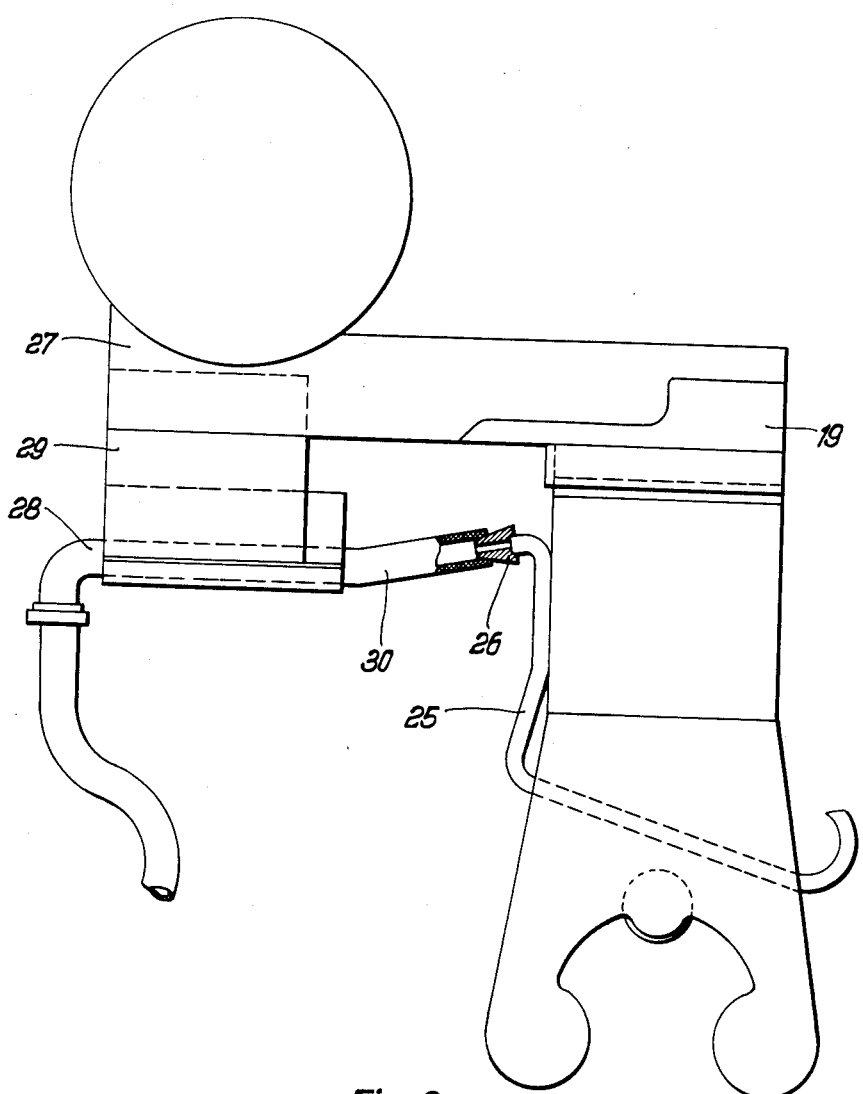

In order that the present invention may be the more readily understood, reference is hereinafter made to the constructional form suitable for the hardening of crankshafts, as illustrated by way of example in the accompanying drawings, in which:

Figure 1 is a side elevation;
Figure 2 a view from the front, and
Figure 3 a plan view of the apparatus;
Figure 4 shows diagrammatically the connection of the two heating conductor loops;
Figure 5 shows the general induction arrangement in the act of connecting the heating apparatus to the carrier;
Figure 6 is a side elevation of the apparatus with provision for discharging the cooling liquid.

As shown in the diagrams, the protective housing consists of two spaced side plates 1, each recessed in the form of jaws. The material employed for the plates is preferably an austenitic heat-resistant steel. Instead of austenitic heat-resistant steel, brass or copper may conveniently be employed, which is provided with a layer of hard chromium in order to increase its wear resistance. The two plates 1, serving as spaced side walls, are held together at the correct distance apart with the aid of distance pins 2 of non-magnetic material, for example brass.

As will be seen in particular from Figure 2, a cage-like structure is thus formed, through which the air can freely flow from the front to the rear. In the region of the concave shaped or jaw-like recesses 3 are disposed distance rollers 4 which serve to maintain the required spacing between the cylindrical workpiece, which is shown in chain lines at 5, and the heating conductor loop 6. These rollers, which consist of heat-resistance steel, may be substituted by nonrotating parts with sliding surfaces or the like in a manner known per se.

Rollers and sliding surfaces of heat-resistant steel may also be provided if desired with a layer of hard chrome in order to promote resistance to wear of said rollers or surfaces in their rolling or sliding on the surface of the workpiece to be hardened. Pins on which the said rollers run may desirably also be hard-chromium-plated.

It has proved particularly favourable for the inductor 6—as shown in Figure 4—to consist of two series-connected heating conductor loops curved in accordance with the surface of the workpiece 5. In this case, the connecting conductor 9 and the two lead sections 10 to be narrowed in the region of the top of the mouth 3 in order to afford space for the distance roller 4 arranged therein. The conductor sections 9 and 10 are traversed by current in opposite directions, as indicated by arrows, so that their heating action in relation to the workpiece is cancelled out. The inductor is provided with bundles of yoke laminations in a manner known per se in order to control the heat action.

As will be seen, the current-carrying parts are arranged in completely self-supporting fashion between the plates 1. They consist in known manner of copper tube through which in operation cooling medium flows. After flowing through the inductor, the cooling liquid is discharged into the atmosphere through the pipes 12. The current and the cooling water are introduced from above at the point where the plates 1 are secured to the carrier element or packing member 13. The said packing member serves at the same time as a support for the electric contact elements 14, and for the guide surfaces 15, with the aid of which the detachable connection to the movable carried 19 is made.

Figure 3:
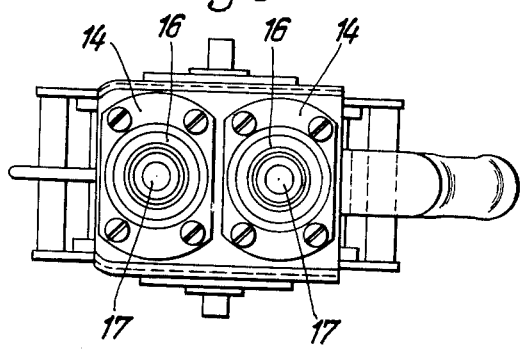

In order to make contact between the carrier 19 (Figure 5) and the actual inductor, annular contact members 14 having conical contact surfaces 16 are arranged in juxtaposition on the upper side of the inductor (Figure 3). The said contact members have internal bores 17 through which the cooling medium necessary for the heating conductors is supplied or discharged. Corresponding contact members having corresponding conical surfaces are provided on the lower side of the carrier 19, which are each connected to the current source or to the intermediate transformer by a feed bar.

In order to complete the apparatus externally, a handle 18 may be provided to enable it to be readily pushed into the carrier 19. Angular guide members 15 on the apparatus and angular guide members 20 on the carrier 19 then inter-engage. The heating apparatus slides in these guides up to an end stop (not shown) which ensures that the cones 16 lie opposite one another in this position. Instead of the angular guides shown, differently fashioned guides, for example dovetail-like guides or the like, may be employed. In the aforesaid end position, the clamping hooks 23 are pulled upwards over an eccentric shaft by the lever 21 when the pins 24 have engaged in the clamping hooks 23 in the end position of the inductor. Thus, not only the required contact pressure is established, but the lip rings consisting of rubber are pressed together so as to seal the cooling water guides 17. Consequently, the mechanical locking and the electrical contact, as well as the sealing connection for the cooling medium supply, are simultaneously established with the eccentric lever 21. The current and cooling medium supply means are connected to the carrier 19 in the usual manner.

Normally, the cooling water fed through the apertures 17 to the inductor escape into the atmosphere through the discharge pipes 12 (Figure 5), for example at the rear part of the inductor. Instead of these outlets, an arrangement may be provided in accordance with a further development of the invention, in which the outlet pipes 12 are upwardly extended, as shown at 25 in Figure 6, and terminate in conical portions 26. Corresponding sockets 28 are securely fitted to the rear part 27 of the carrier 19 by means of insulating clips 29. The sockets 28 are freely movable at their forward ends 30. When the heating inductor is pushed into the carrier 19, the cones 26 enter the freely movable forward socket ends 30. By firmly clamping the inductor against the carrier by means of the lever 21, the cones 26 are lifted somewhat. The freely movable part 30 of the rubber socket can follow this movement and thus establishes the seal. The cooling medium for the heating conductors is thus prevented from flowing into the quenching medium tank situated, for example, below the heating inductor, which is important in cases where a quenching medium other than pure water is employed, for example an oil and water emulsion, a salt solution or the like.

In using the apparatus, it is mounted on the crankshaft pin during the rotation, this being possible owing to the movable suspension of the carrier 19. This method of operation is possible because the protective housing formed of the plates 1 and the distance pins 2 is capable of withstanding the mechanical stresses thus set up and withholds these stresses from the unsupported current-conducting parts of the heating conductor loop. The introduction between the crank webs is facilitated by the lead-in effect of bent-inward ends 22 of the mouth aperture 3 (see in particular Figure 2).

It is naturally possible to form apertures, e. g., slots in the plates 1 without impairing the stability thereof, and thus to suppress or reduce certain eddy current formations. It will also be seen that the construction of the apparatus may be varied for the purpose of adaptation to particular uses without departing from the principle of the invention, that is to say, the stable construction of a metallic housing having an internal unsupported inductor. Moreover, the cooling medium discharge ducts 12 (Figure 1) may be extended along the inner walls of the plates in order to cool them before the liquid is discharged into the atmosphere.

What we claim is:

1. Induction heating apparatus of the kind defined suitable for heating the crank pins of crank shafts, comprising an inductor loop, current conducting parts therefor, and a member for maintaining a workpiece in heating relation thereto and for protecting the said inductor and current conducting parts from mechanical stress during operation, said member comprising two metallic saddle plates and metallic distance pieces holding said plates together in spaced relation to form a cage-like structure that with the inductor loop can saddle a said crank pin the inductor being suspended between said plates so that air can flow freely through the cage-like structure and cool the inductor and said structure, the said structure being the inductor-protecting part which comes into contact with the workpiece and is most exposed to the radiant heat therefrom.

2. Induction heating apparatus of the kind defined comprising an inductor, current conducting parts therefor, and a member for maintaining a workpiece in heating relation thereto and for protecting the said inductor and current conducting parts from mechanical stresses during operation, said member comprising two metallic plates and metallic distance pieces holding said plates together in spaced relation to form a cage-like structure, the inductor being suspended between said plates so that air can flow freely through the cage-like structure and cool the inductor and said structure, the said structure being the inductor-protecting part which comes into contact with the workpiece and is most exposed to the radiant heat therefrom, said plates being formed each with a concave shaped recess for receiving the workpiece therein, and supporting distance means in the region of the said recess adapted to the form of the workpiece, the inductor being in the form of two series connected heating conductor loops adapted to the contour of the workpiece and having oppositely directed current fed connecting conductor portions affording space for part of said means at the upper part of the recess.

3. Induction heating apparatus of the kind defined comprising an inductor, current conducting parts therefor, and a member for maintaining a workpiece in heating relation thereto and for protecting the said inductor and current conducting parts from mechanical stresses during operation, said member comprising two metallic plates and metallic distance pieces holding said plates together in spaced relation to form a cage-like structure, the inductor being suspended between said plates so that air can flow freely through the cage-like structure and cool the inductor and said structure, the said structure being the inductor-protecting part which comes into contact with the workpiece and is most exposed to the radiant heat therefrom, said member being attached to an electric contact member which is attachable to carrier having electric contacts, means for operatively relating said contact member and said carrier, means for urging the contact member against the said carrier to bring the respective contact members into secure electrical connection, and said apparatus having cooperating conical contact members associated therewith.

4. Induction heating apparatus of the kind defined comprising an inductor, current conducting parts therefor, and a member for maintaining a workpiece in heating relation thereto and for protecting the said inductor and current conducting parts from mechanical stresses during operation, said member comprising two metallic plates and metallic distance pieces holding said plates together in spaced relation to form a cage-like structure, the inductor being suspended between said plates so that air can flow freely through the cage-like structure and cool the inductor and said structure, the said structure being the inductor-protecting part which comes into contact with the workpiece and is most exposed to the radiant heat therefrom, said member being attached to an electric contact member which is attachable to a carrier having electric contacts and means for operatively relating said contact member and said carrier and means for urging the contact member against the said carrier to bring the contacts of the contact member and those on the carrier into secure electrical connection, said contact member and carrier having co-operating fluid passages, sealing means between the said passages, and said means for urging the contact member against the said carrier being adapted simultaneously to seal off the said passages.

References Cited in the file of this patent

UNITED STATES PATENTS

| | | |
|---|---|---|
| 2,343,889 | Denneen et al. | Mar. 14, 1944 |
| 2,596,636 | Wright | May 13, 1952 |
| 2,657,298 | Andrus | Oct. 27, 1953 |
| 2,672,550 | Vaughan | Mar. 16, 1954 |
| 2,673,922 | Edwards | Mar. 30, 1954 |

FOREIGN PATENTS

| | | |
|---|---|---|
| 68,780 | Norway | Sept. 4, 1943 |